(12) United States Patent
Kado et al.

(10) Patent No.: US 11,879,463 B2
(45) Date of Patent: Jan. 23, 2024

(54) REFUELING SCREW COMPRESSOR

(71) Applicant: Hitachi Industrial Equipment Systems Co., Ltd., Tokyo (JP)

(72) Inventors: Tomoyuki Kado, Tokyo (JP); Kentaro Yamamoto, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 0 days.

(21) Appl. No.: 17/797,145

(22) PCT Filed: Dec. 29, 2020

(86) PCT No.: PCT/JP2020/049289
§ 371 (c)(1),
(2) Date: Aug. 3, 2022

(87) PCT Pub. No.: WO2021/171783
PCT Pub. Date: Sep. 2, 2021

(65) Prior Publication Data
US 2023/0063997 A1  Mar. 2, 2023

(30) Foreign Application Priority Data
Feb. 25, 2020  (JP) .................................. 2020-029019

(51) Int. Cl.
*F04C 28/28* (2006.01)
*F04C 18/16* (2006.01)

(52) U.S. Cl.
CPC .............. *F04C 28/28* (2013.01); *F04C 18/16* (2013.01); *F04C 2270/80* (2013.01); *F04C 2270/90* (2013.01)

(58) Field of Classification Search
CPC .......... F04C 18/16; F04C 18/18; F04C 18/20; F04C 2/16; F04C 2/18; F04C 2/20;
(Continued)

(56) References Cited

U.S. PATENT DOCUMENTS

| 4,502,833 A | * | 3/1985 | Hibino | .................... F04C 28/24 |
| | | | | 415/17 |
| 6,461,112 B1 | * | 10/2002 | Ohta | ....................... F04C 28/08 |
| | | | | 417/18 |

(Continued)

FOREIGN PATENT DOCUMENTS

| JP | 2017-036719 A | 2/2017 |
| JP | 2019-085971 A | 6/2019 |

OTHER PUBLICATIONS

International Search Report of PCT/JP2020/049289 dated Mar. 9, 2021.

(Continued)

*Primary Examiner* — Mark A Laurenzi
*Assistant Examiner* — Xiaoting Hu
(74) *Attorney, Agent, or Firm* — Mattingly & Malur, PC

(57) ABSTRACT

In the operation of a refueling screw compressor, when load conditions constantly fluctuate or when the rotation speed control of a cooling fan is performed, it is difficult to accurately perform a diagnosis predicted from measurement results of devices inside the compressor, so a diagnostic mode stably creates an operating condition under which an accurate diagnosis can be performed. In the refueling screw compressor, a discharge electric valve is provided downstream of an air cooler, and an air release electric valve and a dedicated orifice are provided to connect an oil separator inner space and a suction throttle valve space. In the diagnostic mode, the discharge electric valve is closed, the air release electric valve is opened, and while an upstream pressure of the oil separator is maintained at a specified pressure, a rotation speed control operation of a compressor body and the diagnosis of internal devices are performed.

8 Claims, 6 Drawing Sheets

(58) Field of Classification Search
CPC .............. F04C 15/0088; F04C 15/0092; F04C 15/0096; F04C 28/28; F04C 14/28; F04C 2270/80; F04C 29/02; F04C 29/021; F04C 29/026; F04C 29/028; F04C 29/04; F01C 1/16; F01C 1/18; F01C 1/20; F01C 21/04; F01C 21/045; F01C 21/06; F01C 20/28

See application file for complete search history.

(56) References Cited

U.S. PATENT DOCUMENTS

| | | | | |
|---|---|---|---|---|
| 8,241,007 | B2* | 8/2012 | Tanaka | F04C 29/126 |
| | | | | 417/28 |
| 2010/0166571 | A1* | 7/2010 | Van Den Wyngaert | |
| | | | | F04C 28/26 |
| | | | | 417/279 |
| 2010/0233004 | A1* | 9/2010 | Matsuzaka | F04C 29/0014 |
| | | | | 418/84 |
| 2016/0245289 | A1* | 8/2016 | Kado | F04C 18/16 |
| 2018/0223847 | A1* | 8/2018 | Fujiwara | F04B 39/16 |

OTHER PUBLICATIONS

Written Opinion of the International Searching Authority of PCT/JP2020/049289 dated Mar. 9, 2021.

* cited by examiner

FIG. 2A
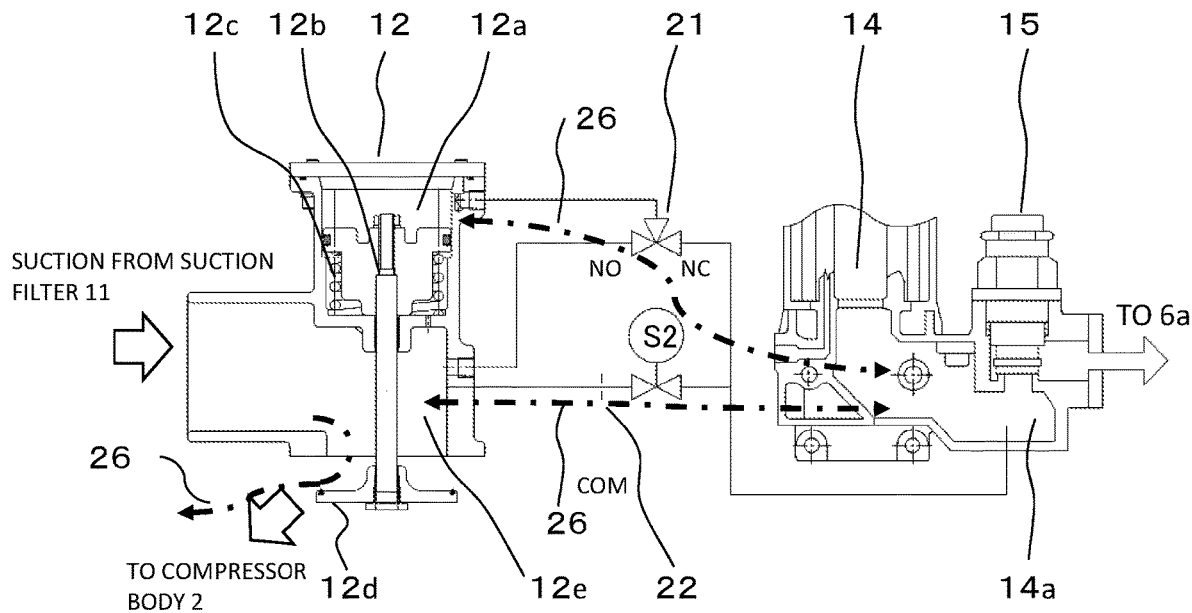
FIG. 2B
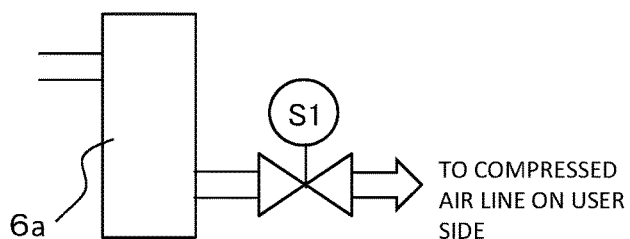
FIG. 2C
|  | DURING COMPRESSOR STOP (DURING NO LOAD OPERATION) | DURING COMPRESSOR OPERATION | DURING DIAGNOSTIC MODE OPERATION |
|---|---|---|---|
| CONTROL ELECTROMAGNETIC VALVE 21 | NO-COM | NC-COM | NO-COM |
| VALVE BODY 12d | CLOSING | OPENING | OPENING |
| AIR RELEASE ELECTRIC VALVE S2 | OPENING | CLOSING | OPENING |
| DISCHARGE ELECTRIC VALVE S1 | OPENING | OPENING | CLOSING |

FIG. 3C

|  | DURING COMPRESSOR STOP (DURING NO LOAD OPERATION) | DURING COMPRESSOR OPERATION | DURING DIAGNOSTIC MODE OPERATION |
|---|---|---|---|
| CONTROL ELECTROMAGNETIC VALVE 21 | NO—COM | NC—COM | NC—COM |
| VALVE BODY 12d | CLOSING | OPENING | OPENING |
| AIR RELEASE ELECTRIC VALVE S2 | OPENING | CLOSING | CLOSING OR OPENING |
| AIR RELEASE ELECTRIC VALVE S3 | CLOSING | CLOSING | OPENING |
| DISCHARGE ELECTRIC VALVE S1 | OPENING | OPENING | CLOSING |

FIG. 4C

|  | DURING COMPRESSOR STOP (DURING NO LOAD OPERATION) | DURING COMPRESSOR OPERATION | DURING DIAGNOSTIC MODE OPERATION |
| --- | --- | --- | --- |
| CONTROL ELECTROMAGNETIC VALVE 21 | NO−COM | NC−COM | NC−COM |
| VALVE BODY 12d | CLOSING | OPENING | OPENING |
| AIR RELEASE ELECTRIC VALVE S2 | OPENING | CLOSING | CLOSING OR OPENING |
| DISCHARGE ELECTRIC VALVE S1 | OPENING | OPENING | CLOSING |
| AIR RELEASE ELECTRIC VALVE S4 | CLOSING | CLOSING | OPENING |

…

REFUELING SCREW COMPRESSOR

TECHNICAL FIELD

The present invention relates to a refueling screw compressor.

BACKGROUND ART

A refueling screw compressor including a pair of male and female screw rotors that are axially parallel to each other and that have opposite torsional directions suctions air through a suction filter installed upstream of a compressor body, removes foreign matter, dust, or the like in the air, takes the air into the compressor body, and then compresses the air to a predetermined pressure in a state where the air is mixed with a lubricant.

Here, because of clogging of the suction filter, the differential pressure increases, and a reduction in the amount of suction air occurs. In order to prevent this problem, it is necessary to measure a differential pressure between an upstream side and a downstream side of the suction filter during operation and to operate a protective device (alarm or abnormal stop) when the differential pressure reaches an upper limit.

In addition, a permanent magnet motor is used to drive the compressor, and when cooling is insufficient, a reduction in torque occurs because of demagnetization of a motor rotor. In order to prevent this problem, it is necessary to measure a temperature of a motor housing during operation and to operate the protective device when the temperature reaches an upper limit temperature.

For example, Patent Document 1 has disclosed a refueling screw compressor including, in order to reduce power loss by refueling in which a rated state is taken into consideration and to suppress moisture condensation by refueling in which moisture condensation is taken into consideration, a compressor body; an oil tank that stores oil; a pipe that sends the oil from the oil tank to an additional refueling port; an additional refueling valve that allows or shuts off a flow of the oil in the pipe; an oil temperature sensor that measures an oil temperature To inside the oil tank; and a control device including an oil temperature closing valve control unit that closes the additional refueling valve when the oil temperature To measured by the oil temperature sensor is lower than a predetermined first oil temperature.

In addition, in Patent Document 1, normally, it is necessary to keep a discharge temperature of the compressor body at a temperature or higher at which drain does not occur in compressed air. For this reason, a technique of controlling an operating rotation speed of a cooling fan according to ambient temperature or load condition has been disclosed.

CITATION LIST

Patent Document

Patent Document 1: JP 2019-085971 A

SUMMARY OF THE INVENTION

Problems to be Solved by the Invention

Since measurement results of the oil temperature sensor and the like change depending on the load condition of the compressor, there is a possibility that it is difficult to accurately diagnose the compressor using measurement results obtained during load fluctuation.

The present invention is conceived in view of the foregoing problems of the related art, and provides a refueling screw compressor that performs an accurate diagnosis by forcibly creating a measurement condition for diagnosing the refueling screw compressor and by using measurement results obtained under the condition.

Solutions to Problems

According to one aspect of the present invention to solve the above problems, there is provided a refueling screw compressor including: a compressor body that compresses air while refueling a lubricant; a suction filter that removes foreign matter, dust, or the like in suction air of the compressor body; a suction throttle valve that suctions the air from the suction filter to adjust a supply of the suction air to the compressor body; an oil tank that stores the lubricant separated from compressed air; an oil separator installed downstream of the oil tank, in which a filtration element is mounted; a first cooler installed downstream of the oil separator to cool the compressed air; a first air release electric valve connecting a space of the oil separator and an upstream space of the suction throttle valve; a second cooler connected to the oil tank to cool the lubricant; an oil filter provided in a circulation path circulating the cooled lubricant to the compressor body again, to prevent contamination of the lubricant; a cooling fan that cools the first cooler and the second cooler; and an operation panel on which an operation mode is input.

Then, the refueling screw compressor includes a control unit that controls an operation of the refueling screw compressor; and a discharge electric valve that shuts off a supply of the compressed air cooled by the first cooler. When a diagnostic mode is selected by the operation panel, the control unit performs control such that the discharge electric valve is closed to shut off the supply of the compressed air, the first air release electric valve is opened to connect the space of the oil separator and the upstream space of the suction throttle valve, and the suction throttle valve is opened to suction the air from the suction filter and to supply the suction air to the compressor body.

Effects of the Invention

According to the present invention, the diagnostic mode is provided in which a stable continuous operation is performed under a constant load condition, and during operation in the diagnostic mode, the compressor can be accurately diagnosed by using measurement results of various measurement devices provided in the compressor.

BRIEF DESCRIPTION OF THE DRAWINGS

FIG. 2A is a flow diagram showing an operation circuit of a refueling screw compressor according to a first embodiment.

FIG. 2B is a flow diagram showing an operation circuit of the refueling screw compressor according to the first embodiment.

FIG. 2C is a table showing states of valves in each operation mode of the refueling screw compressor according to the first embodiment.

FIG. 3C is a table showing states of valves in each operation mode of the refueling screw compressor according to the second embodiment.

FIG. 4C is a table showing states of valves in each operation mode of the refueling screw compressor according to the third embodiment.

MODE FOR CARRYING OUT THE INVENTION

Figure 1:
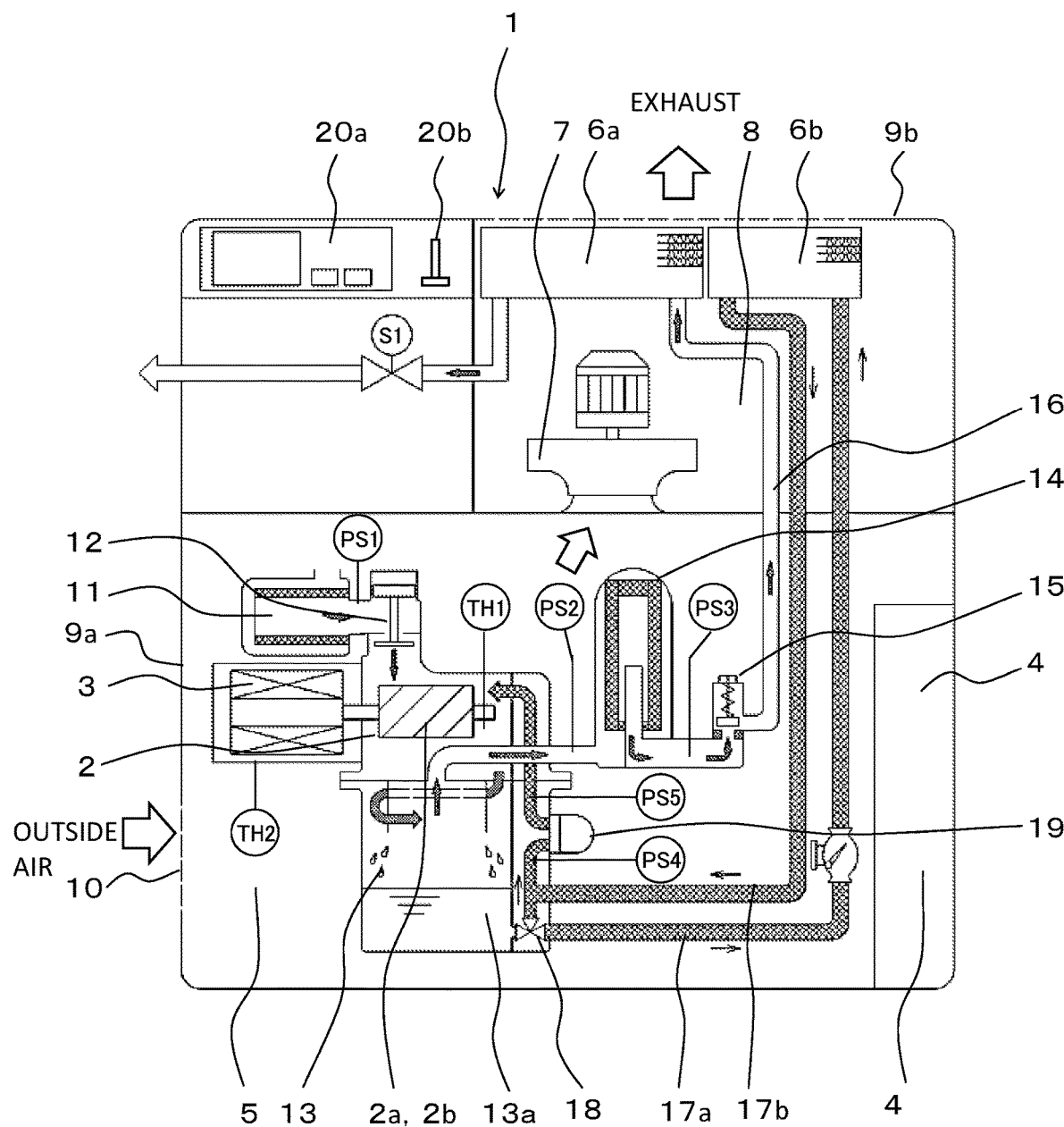
FIG. 1 is a flow diagram showing an internal structure of a refueling screw compressor according to the present embodiment.

Hereinafter, embodiments of the present invention will be described with reference to the drawings.

First, before a detailed description is given, an outline of types and purposes of a diagnosis of, and of problems and solutions of a refueling screw compressor will be described.

As described in the background art, a refueling screw compressor including a pair of male and female screw rotors that are axially parallel to each other and that have opposite torsional directions suctions air in the atmosphere through a suction filter installed upstream of a compressor body, removes foreign matter, dust, or the like in the air, takes the air into the compressor body, and then compresses the air to a predetermined pressure in a state where the air is mixed with a lubricant.

Here, because of clogging of the suction filter, the differential pressure increases, and a reduction in the amount of suction air occurs. In order to prevent this problem, it is necessary to measure a differential pressure between an upstream side and a downstream side of the suction filter during operation and to operate a protective device (alarm or abnormal stop) when the differential pressure reaches an upper limit.

In addition, a permanent magnet motor is used to drive the compressor, and when cooling is insufficient, a reduction in torque occurs because of demagnetization of a motor rotor. In order to prevent this problem, it is necessary to measure a temperature of a motor housing during operation and to operate the protective device when the temperature reaches an upper limit temperature.

In addition to the above-described protective device, in the present embodiment, the following diagnosis of the refueling screw compressor can also be considered.

The lubricant is separated from the compressed air discharged from the compressor body by an oil separation mechanism (primary separation) inside an oil tank and an oil separator (secondary separation). The oil in the compressed air is removed using a centrifugal force or collision in the primary separation and using a filtration element in the secondary separation.

Here, the differential pressure increases because of clogging of the filtration element. In order to prevent an increase in pressure upstream of the filtration element, a differential pressure between an upstream side and a downstream side of the filtration element is measured during operation, and when the differential pressure reaches an upper limit differential pressure, the protective device is operated.

The compressed air from which the lubricant is separated is cooled by a cooler (aftercooler) and discharged to the outside of the compressor and flows toward a place of use of a user.

On the other hand, the separated lubricant is stored in the oil tank for the moment and is circulated to a suction side of the compressor body, specifically, the separated lubricant is extracted and circulated by a differential pressure between pressure inside the oil tank and pressure on the suction side, and a cooler (oil cooler) for cooling and an oil filter that removes foreign matter, sludge, or the like are installed in a circulation path.

Here, in order to prevent the clogging of the oil filter, a differential pressure between an upstream side and a downstream side of the oil filter is measured during operation, and when the differential pressure reaches an upper limit differential pressure, the protective device is operated.

As described above, in the refueling screw compressor, in order to diagnose a state or an operation, it is considered that a diagnosis is performed for each purpose at each place shown below.

(1) Suction filter
  Diagnosis: Performing a diagnosis based on a measured value of a differential pressure of the filter.
  Purpose: Preventing a reduction in the amount of suction air and save energy.
(2) Filtration element (secondary separation)
  Diagnosis: Performing a diagnosis based on a measured value of a differential pressure of the element.
  Purpose: Preventing an increase in the pressure of the compressor body and save energy.
(3) Oil filter
  Diagnosis: Performing a diagnosis based on a measured value of a differential pressure of the filter.
  Purpose: Preventing an increase in the degree of contamination of the lubricant and to prevent a reduction in the life of components inside the compressor.
(4) Cooler (oil cooler)
  Diagnosis: Performing a diagnosis based on a measured value of the temperature of the lubricant.
  Purpose: Preventing an increase in temperature and prevent a reduction in the life of the lubricant.
(5) Permanent magnet motor
  Diagnosis: Performing a diagnosis based on a measured value of the temperature of the motor housing.
  Purpose: Preventing an increase in temperature and prevent a reduction in torque caused by the demagnetization of the motor rotor.

Abnormal stop can be prevented beforehand by performing the above diagnoses (measurement results) of (1) to (5), by investigating the cause when there is an abnormality, and by taking measures such as cleaning and component replacement.

Meanwhile, since measurement results change depending on the load condition of the compressor, there is a possibility that it is difficult to accurately diagnose the compressor even using measurement results obtained during load fluctuation.

As Example 1, when the load factor of the compressor is 50%, the differential pressures measured in the above-described (1) and (2) are theoretically reduced to 25% as compared to when the load factor is 100%. This is intended to reduce the operating rotation speed of the compressor and to adjust the amount of discharge air to 50% when the load factor of the compressor is 50%. Namely, since the differential pressure changes greatly at the square of the load factor, it is considered that it is difficult to accurately diagnose the compressor from a differential pressure measured when the load fluctuates.

Further, as Example 2, regarding the temperature measured in the above-described (4), normally, it is necessary to keep the discharge temperature of the compressor body at a temperature or higher at which drain does not occur in the compressed air. For this reason, when the operating rotation speed of the cooling fan is controlled according to ambient temperature and load condition, the measured temperature also fluctuates because of cooling by the cooling fan, so that it is considered that it is difficult to accurately diagnose the compressor.

As described above, when the load condition constantly fluctuates or when the rotation speed control of the cooling fan is performed, it is difficult to perform an accurate diagnosis from measurement results of the devices inside the compressor, which is a problem.

In order to solve this problem, the compressor can be accurately diagnosed by performing operation under the following conditions of (a) and (b) and by using measurement results obtained from the operation.

(a) Operation is performed at around a load factor of 100% for a certain period and then measurement is performed.

In order to perform operation under this condition, since there is a possibility that load fluctuation as described in the above-described Example 1 occurs, it is necessary to perform the operation in a state where a pipe through the compressed air flows is disconnected from a compressed air line of the user. Here, it is necessary to switch the pipe through the compressed air flows to a pipe including a dedicated orifice which is adjusted such that the operating rotation speed of the compressor is a predetermined rotation speed, for example, around 100% (full speed) when a discharge pressure upstream of the filtration element inside the oil separator described above reaches a specified pressure of the compressor, and then to perform operation. This makes it possible for the load factor to be around 100%.

(b) The cooling fan that cools the cooler operates at a full rotation speed.

In order to perform operation under this condition, it is necessary to operate the cooling fan with the rotation speed fixed so as to forcibly reach the full speed instead of performing the rotation speed control described in the above-described Example 2.

Namely, since it is very difficult to create the operating conditions of the above-described (a) and (b) in an operating state where the user normally uses the compressor, the problem can be solved by forcibly creating an operation mode (diagnostic mode) in which the operating conditions of (a) and (b) are satisfied.

<Outline>

The present embodiment provides the refueling screw compressor that accurately diagnoses the compressor by forcibly creating a measurement condition for diagnosing the devices inside the refueling screw compressor and by using measurement results obtained under the condition for diagnosis. In addition, there is provided the refueling screw compressor that can prevent abnormal stop beforehand by operating the protective device or the like based on diagnostic results.

For example, the refueling screw compressor of the present invention has a function of operating under a condition required for diagnosis according to a command by a button operation from an operation panel or by a remote operation from the outside (hereinafter, referred to as a diagnostic mode). In order to create a load factor of around 100% in this diagnostic mode, the pipe through which the compressed air flows is disconnected from the compressed air line of the user, and the dedicated orifice which is adjusted such that the operating rotation speed of the compressor is around 100% when the discharge pressure upstream of the filtration element inside the oil separator reaches the specified pressure is provided in a pipe connecting a suction throttle valve 12 that controls a supply of the compressed air and a space of an oil separator 14. Further, an air release electric valve S2 is provided in this pipe and is switched to perform operation.

Further, in the diagnostic mode, the rotation speed control of the cooling fan to maintain the temperature of the lubricant at a constant temperature is not performed, and the cooling fan is operated with the rotation speed forcibly fixed at the full speed.

The compressor can be accurately diagnosed by performing operation in this state for a certain period and by using measurement results of the devices in a state where the load factor or the temperature of the compressed air is stabilized to some extent.

First Embodiment

A first embodiment of the refueling screw compressor according to the present invention will be described with reference to the drawings.

FIG. 1 is a (flow) diagram showing an internal structure of the refueling screw compressor.

A refueling screw compressor 1 includes a machine room 5; a cooling room 8; an operation panel 20a that is operated by a user to operate the compressor; and a communication antenna 20b for remotely monitoring and remotely operating an operating situation of the compressor. These components are covered with soundproof covers 9a and 9b that suppress the propagation of noise to the outside of the compressor.

The machine room 5 includes a compressor body 2 that generates compressed air; a motor 3 that drives the compressor body 2; and a control unit 4 including a controller for driving the compressor, a control board, and the like.

The machine room 5 includes the compressor body 2 that compresses air while refueling a lubricant; a suction filter 11 that removes foreign matter, dust, or the like in suction air of the compressor body; the suction throttle valve 12 that adjusts a supply of the suction air; an oil tank 13 that stores the lubricant separated from the compressed air; the oil separator 14 which is located downstream of the oil tank 13 and in which a filtration element is mounted; and a check valve 15 located downstream of the oil separator 14 to adjust pressure to a certain pressure so as to suppress a flow speed of the compressed air passing through the oil separator and to prevent a backflow of compressed air on a user side.

The cooling room 8 includes a cooling fan 7 that cools the compressed air in an air cooler 6a and the lubricant in an oil cooler 6b, respectively.

The cooling fan 7 takes in outside air from a suction port 10 of the machine room 5 and cools the air cooler 6a and the oil cooler 6b installed at an upper portion. In addition, the compressor body 2 compresses the air taken in from the suction port 10.

The cooling room 8 includes the air cooler 6a located downstream of the check valve 15 to cool the compressed air; a discharge electric valve S1 located downstream of the air cooler 6a to shut off a path through which the compressed air flows to a line side of the user; an air release electric valve S2 provided to connect an oil separator inner space 14a and an upstream space 12a of the suction throttle valve 12 (refer to FIG. 2A); and a dedicated orifice 22 provided on a pipe path to adjust a flow rate with respect to the air release electric valve S2 (refer to FIG. 2A).

The compressor body 2 includes a pair of male and female rotors 2a and 2b and compresses the air suctioned from the inside of the machine room 5 through the suction filter 11 and through the suction throttle valve 12, with the rotors 2a and 2b.

At this time, the lubricant is sprayed into the compressor body 2 to cool the rotors 2a and 2b and to provide sealing between the rotors 2a and 2b. The compressed air mixed with the lubricant is introduced into the oil tank 13, separated from the lubricant, then further separated from the lubricant by the oil separator 14, flows from the check valve 15 to the air cooler 6a through an air pipe 16 and is cooled. After passing through the discharge electric valve S1, the compressed air is discharged from the unit and is supplied to the user as the compressed air.

Here, when the flow speed of the compressed air passing through the filtration element inside the oil separator 14 is fast, since the compressed air cannot be sufficiently separated from the lubricant and flows to a downstream side, the passing flow speed is adjusted by increasing pressure inside the oil separator 14 to a certain pressure using the check valve 15.

In addition, during compressor stop, the discharge electric valve S1 and the air release electric valve S2 are opened, and the pressure inside the oil separator 14 is the atmospheric pressure. At this time, the check valve 15 also has a check valve function of preventing the compressed air on the user side from returning into the oil separator 14.

On the other hand, a lubricant 13a inside the oil tank 13 is sent to the oil cooler 6b through an oil pipe 17a by a pressure difference between a primary side and a secondary side of the rotors 2a and 2b and is cooled. A temperature adjusting valve 18 is provided upstream of the oil pipe 17a, and when the discharge temperature of the compressor body 2 is low, a part of the lubricant 13a does not flow to the oil cooler 6b but directly flows to the compressor body 2.

Incidentally, the cooled lubricant 13a is sent to the compressor body 2 through an oil pipe 17b and is sprayed on the rotors 2a and 2b again.

Here, an oil filter 19 is provided upstream of the compressor body 2 and removes foreign matter, sludge, or the like in the lubricant in the circulation path circulating the cooled lubricant to the compressor body 2 again.

In the refueling screw compressor of the present embodiment, the following measurement devices for diagnosis are installed: (1) a differential pressure sensor PS1 that measures a differential pressure in the suction filter 11 (measurement of a differential pressure of the suction filter 11); (2) pressure sensors PS2 and PS3 located upstream of and downstream of the oil separator, respectively, to measure a differential pressure of the filtration element (measurement of a differential pressure of the element inside the oil separator 14); (3) the oil separator 14 that prevents contamination of the lubricant and pressure sensors PS4 and PS5 located upstream of and downstream of the oil filter, respectively, to measure a differential pressure (measurement of a differential pressure of the oil filter 19); (4) a temperature sensor TH1 located downstream of the compressor body to measure a temperature of the circulating lubricant (measurement of a discharge temperature of an outlet of the compressor body 2); and (5) a temperature sensor TH2 provided in the permanent magnet motor that drives the compressor body, to measure a temperature of the housing (measurement of a temperature of the motor housing).

The control unit 4 controls each part of the refueling screw compressor 1, such as the motor 3, the cooling fan 7, the suction throttle valve 12, the discharge electric valve S1, and the air release electric valve S2.

The operation panel 20a includes a control board that controls the devices inside the compressor, and a panel for inputting an operation mode.

When the diagnostic mode is selected by a button operation from the operation panel or by a remote operation from the outside, the control unit 4 is controlled such that the discharge electric valve S1 is closed, the air release electric valve S2 is opened, the operation of the compressor is started in a state where the suction throttle valve 12 is opened, and the compressed air flows through the path of the air release electric valve S2 and passes through the dedicated orifice 22 provided in the path.

The compressed air is released to an upstream side of the connected suction throttle valve 12, and when an upstream pressure of the oil separator 14 reaches the specified pressure, the refueling screw compressor 1 performs rotation speed control while maintaining the upstream pressure of the oil separator 14 at the specified pressure. At this time, the predetermined rotation speed (rotation speed is around a load factor of 100%) is maintained by the dedicated orifice 22. The cooling fan 7 that cools a cooler 6 is operated at the predetermined rotation speed (full speed) by control of the control unit 4.

As for the diagnostic mode, the diagnostic mode is selected on the operation panel 20a, or the diagnostic mode is selected by a remote operation from the outside using the communication antenna 20b. The communication antenna 20b receives a wireless signal for selecting an operation mode of the refueling screw compressor 1 from an external device.

When the diagnostic mode is selected, while the discharge electric valve S1 downstream of the air cooler 6a is closed by control of the control unit 4 to shut off the compressed air line of the user, a stable continuous operation is performed under a constant load condition by control to be described in FIGS. 2A to 2C, 3A to 3C, and 4A to 4C. The refueling screw compressor 1 can perform an accurate diagnosis using measurement results.

The locations to be diagnosed by the refueling screw compressor 1 and the sensors are, as described above, the differential pressure sensor PS1 that measures a differential pressure in the suction filter 11 (measurement of a differential pressure of the suction filter 11), the pressure sensors PS2 and PS3 located upstream of and downstream of the oil separator, respectively, to measure a differential pressure of the filtration element (measurement of a differential pressure of the element inside the oil separator 14), the oil separator 14 that prevents contamination of the lubricant, the pressure sensors PS4 and PS5 located upstream of and downstream of the oil filter, respectively, to measure a differential pressure (measurement of a differential pressure of the oil filter 19), the temperature sensor TH1 located downstream of the compressor body to measure a temperature of the circulating lubricant (measurement of a discharge temperature of the outlet of the compressor body 2), and the temperature sensor TH2 provided in the permanent magnet motor that drives the compressor body, to measure a temperature of the housing (measurement of a temperature of the motor housing). The diagnosis of each part of the refueling screw compressor 1 is performed by these measurements.

For example, a reduction in the amount of suction air is prevented and energy is saved based on a diagnostic result of the suction filter 11, an increase in the pressure of the compressor body is prevented and energy is saved based on a diagnostic result of the filtration element, an increase in the degree of contamination of the lubricant is prevented and a reduction in the life of the components inside the compressor body is prevented based on a diagnostic result of the oil filter 19, an increase in temperature is prevented and a reduction in the life of the lubricant is prevented by the temperature sensor TH1 that measures a temperature of the circulating lubricant, and an increase in temperature is prevented and a reduction in torque caused by the demagnetization of the motor rotor is prevented by the temperature sensor TH2.

FIGS. 2A and 2B are diagrams showing an operation circuit of the refueling screw compressor.

The suction throttle valve 12 is installed upstream of the compressor body 2 and includes a piston 12b in a piston chamber 12a, a spring 12c that pushes up the piston 12b, a valve body 12d that moves in connection with the piston 12b, and the like.

The suction throttle valve 12 is connected to the oil separator inner space 14a by a pipeline to allow the air to flow. In addition, the piston chamber 12a, a suction throttle valve space 12e, and the oil separator inner space 14a are connected to each other by a pipeline through a control electromagnetic valve 21. In addition, the oil separator inner space 14a is connected to the suction throttle valve space 12e by a pipeline through the air release electric valve S2.

Here, the dedicated orifice 22 which is adjusted such that the operating rotation speed of the compressor is around 100% when the discharge pressure upstream of the filtration element inside the oil separator 14 reaches the specified pressure is provided downstream of the air release electric valve S2 for the air release electric valve S2.

The operation mode of the refueling screw compressor 1 includes three modes such as compressor stop, compressor operation, and the diagnostic mode, and the following control is performed in each operation mode by control of the control unit 4 according to an operation mode input from the operation panel 20a.

As shown in FIG. 2C, during compressor stop, the control electromagnetic valve 21 is set to NO-COM, so that the piston chamber 12a and the suction throttle valve space 12e are connected to each other to cause pressure in the piston chamber 12a to be the atmospheric pressure, the piston 12b is moved upward by the spring 12c, the valve body 12d is closed in connection with the movement, and taking air into the compressor body 2 is stopped. At this time, the air release electric valve S2 is opened, so that the compressed air inside the oil separator 14 is released to the suction throttle valve space 12e, namely, to the atmosphere.

During compressor operation, the control electromagnetic valve 21 is set to NC-COM, so that the oil separator inner space 14a and the piston chamber 12a are connected to each other to allow the air to flow, the piston 12b receives pressure inside the oil separator 14 to move downward, the valve body 12d is opened in connection with the movement, and the air is taken into the compressor body 2, and at this time, the air release electric valve S2 is closed.

In the diagnostic mode, since the control electromagnetic valve 21 is set to NC-COM, the valve body 12d is opened, and the air is taken into the compressor body 2, but the discharge electric valve S1 is closed, the pressure inside the compressor increases, but the air release electric valve S2 is opened to release the compressed air inside the oil separator 14 to the suction throttle valve space 12e. FIG. 2 shows an air flow 26 in the diagnostic mode.

In the diagnostic mode, the upstream pressure of the oil separator 14 is measured by the pressure sensor PS2, a measured value of the upstream pressure is taken into the control unit 4, and the rotation speed control of the compressor body 2 is performed while the specified pressure is maintained. In addition, operation is performed in a state where the load factor is set to a rotation speed of a predetermined value (around 100%) by the dedicated orifice 22.

According to the first embodiment, a stable continuous operation can be performed under a constant load condition, and a state of the refueling screw compressor can be accurately measured by the measurement devices.

Second Embodiment

A second embodiment of the refueling screw compressor will be described with reference to the drawings.

Figure 3A:
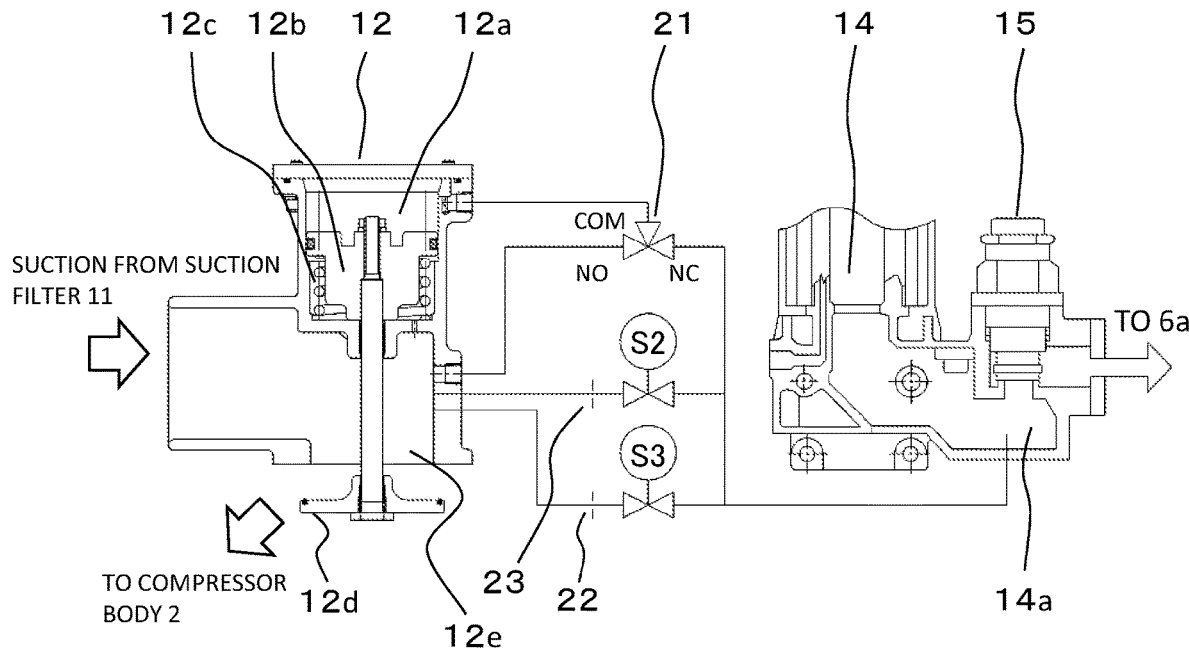
FIG. 3A is a flow diagram showing an operation circuit of a refueling screw compressor according to a second embodiment.
Figure 3B:
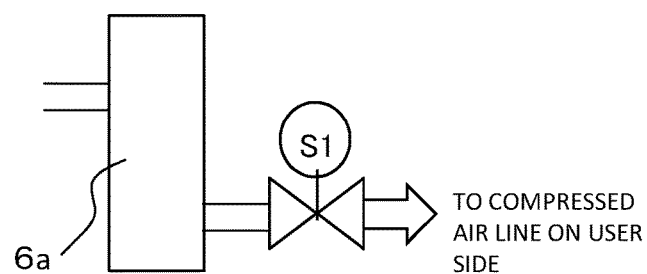
FIG. 3B is a flow diagram showing an operation circuit of the refueling screw compressor according to the second embodiment.

In FIGS. 3A to 3C, the dedicated orifice 22 downstream of the air release electric valve S2 is changed to a dedicated orifice 23, and an air release electric valve S3 and the dedicated orifice 22 are added in parallel to the air release electric valve S2 when compared to FIGS. 2A to 2C.

As described above, during compressor stop, the air release electric valve S2 is opened to release the compressed air inside the oil separator 14. Here, in a case where it is necessary to adjust an air release time, it is necessary to install another dedicated orifice 23, and in this case, since it is considered that the diagnostic mode condition described in FIG. 1 (the rotation speed control is performed while the specified pressure is maintained, and operation is performed at a rotation speed of around 100%) cannot be satisfied, such a case is coped with by adding the air release electric valve S3 and the dedicated orifice 22 dedicated to the diagnostic mode.

Accordingly, in the diagnostic mode, the diagnostic mode condition is satisfied by setting the control electromagnetic valve 21 to NC-COM, by opening the valve body 12d, by closing the discharge electric valve S1, and by opening the air release electric valve S3.

Incidentally, in the diagnostic mode, since the diagnostic mode condition can be satisfied by increasing the passage area of the dedicated orifice 22 when the air release electric valve S2 is closed and by decreasing the passage area when the air release electric valve S2 is opened, both the closing and the opening of the air release electric valve S2 are possible.

Third Embodiment

A third embodiment of the refueling screw compressor will be described with reference to the drawings.

Figure 4A:
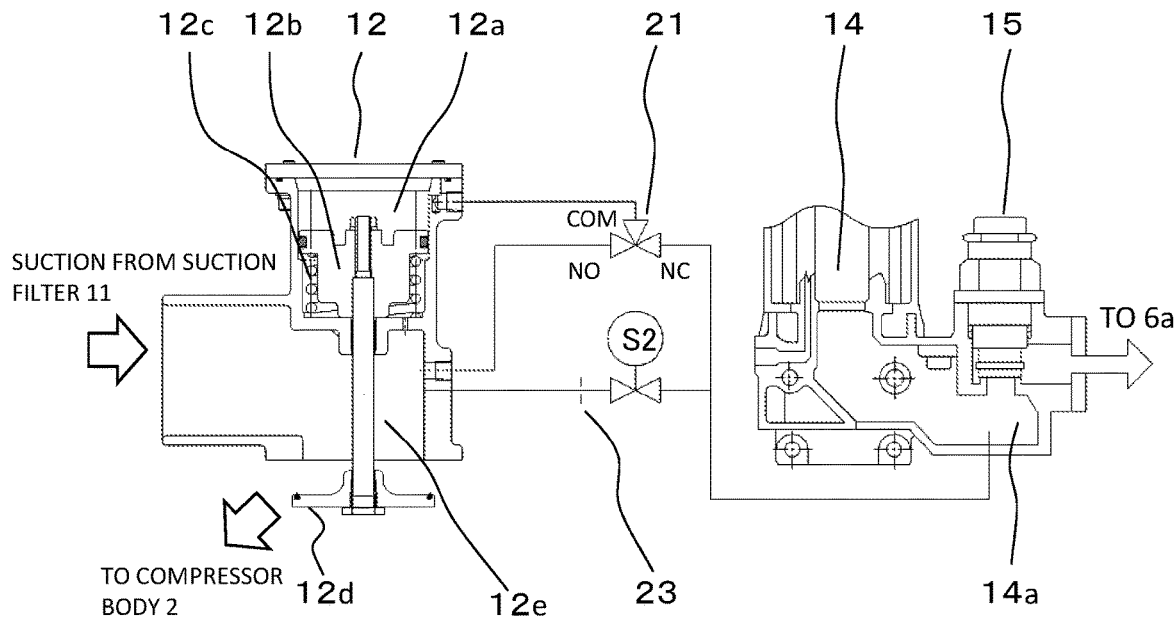
FIG. 4A is a flow diagram showing an operation circuit of a refueling screw compressor according to a third embodiment.
Figure 4B:
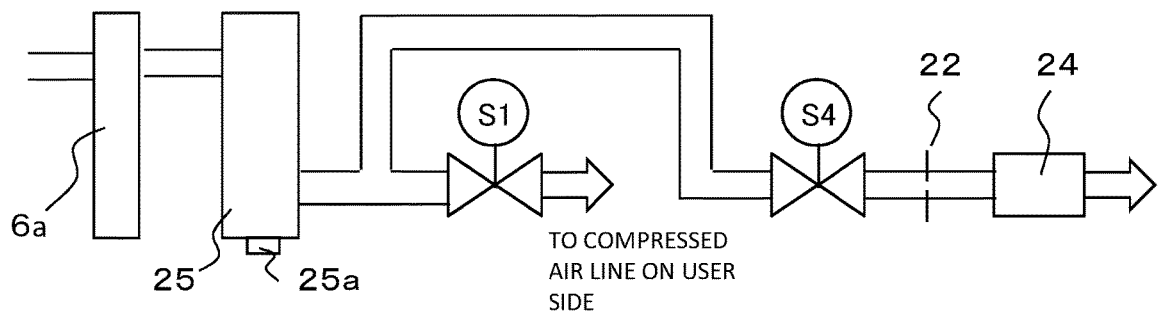
FIG. 4B is a flow diagram showing an operation circuit of the refueling screw compressor according to the third embodiment.

In FIGS. 4A to 4C, the air release electric valve S3 and the dedicated orifice 22 are eliminated, and an air release electric valve S4 and the dedicated orifice 22 dedicated to the diagnostic mode and an air release silencer 24 are added in parallel to the discharge electric valve S1 downstream of the air cooler 6a when compared to FIGS. 3A to 3C.

Accordingly, in the diagnostic mode, the diagnostic mode condition is satisfied by setting the control electromagnetic valve 21 to NC-COM, by opening the valve body 12d, by closing the discharge electric valve S1, and by opening the air release electric valve S4, and air release sound of the compressed air is silenced by the air release silencer 24.

Incidentally, as shown in FIG. 4C, similarly to the description in FIG. 3C, in the diagnostic mode, both the closing and the opening of the air release electric valve S2 are possible.

In addition, in the third embodiment, when an air dryer 25 is installed downstream of the air cooler 6a, whether or not a dew point can be maintained can be diagnosed by measuring a temperature of a heat exchanger 25a.

In the present embodiment, when the diagnostic mode is selected and the compressor is operated, a stable continuous operation can be performed under a constant load condition, and at this time, an accurate diagnosis can be performed by using measurement results of the measurement devices provided in the devices, for diagnosis.

REFERENCE SIGNS LIST

| | |
|---|---|
| 1 | Refueling screw compressor |
| 2 | Compressor body |
| 2a, 2b | Rotor |
| 3 | Motor |
| 4 | Control unit |
| 5 | Machine room |
| 6a | Air cooler |
| 6b | Oil cooler |
| 7 | Cooling fan |
| 8 | Cooling room |
| 9a, 9b | Soundproof cover |
| 10 | Suction port |
| 11 | Suction filter |
| 12 | Suction throttle valve |
| 12a | Piston chamber |
| 12b | Piston |
| 12c | Spring |
| 12d | Valve body |
| 12e | Suction throttle valve space |
| 13 | Oil tank |
| 13a | Lubricant |
| 14 | Oil separator |
| 14a | Oil separator inner space |
| 15 | Check valve |
| 16 | Air pipe |
| 17a, 17b | Oil pipe |
| 18 | Temperature adjusting valve |
| 19 | Oil filter |
| 20a | Operation panel |
| 20b | Communication antenna |
| 21 | Control electromagnetic valve |
| 22 | Dedicated orifice |
| 23 | Dedicated orifice |
| 24 | Silencer |
| S1 | Discharge electric valve |
| S2, S3, S4 | Air release electric valve |

The invention claimed is:

1. A refueling screw compressor comprising:
a compressor body that compresses air while refueling a lubricant;
a suction filter that removes foreign matter, dust, or the like in suction air of the compressor body;
a suction throttle valve that suctions the air from the suction filter to adjust a supply of the suction air to the compressor body;
an oil tank that stores the lubricant separated from compressed air;
an oil separator installed downstream of the oil tank, in which a filtration element is mounted;
a first cooler installed downstream of the oil separator to cool the compressed air;
a first air release electric valve connecting a space of the oil separator and an upstream space of the suction throttle valve;
a second cooler connected to the oil tank to cool the lubricant;
an oil filter provided in a circulation path circulating the cooled lubricant to the compressor body again, to prevent contamination of the lubricant;
a cooling fan that cools the first cooler and the second cooler;
an operation panel on which an operation mode is input;
a control unit that controls an operation of the refueling screw compressor; and
a discharge electric valve that shuts off a supply of the compressed air cooled by the first cooler,
wherein when a diagnostic mode is selected by the operation panel, the control unit performs control such that the discharge electric valve is closed to shut off the supply of the compressed air, the first air release electric valve is opened to connect the space of the oil separator and the upstream space of the suction throttle valve, and the suction throttle valve is opened to suction the air from the suction filter and to supply the suction air to the compressor body.

2. The refueling screw compressor according to claim 1, wherein in an operating state of the diagnostic mode, a measurement of a differential pressure of the suction filter, a measurement of a differential pressure of the oil separator, a measurement of a differential pressure of the oil filter, a temperature measurement for measuring a temperature of the circulating lubricant, and a measurement of a temperature of the compressor body are performed, and a state of the refueling screw compressor is measured.

3. The refueling screw compressor according to claim 1, further comprising:
an external communication antenna connected to the operation panel to receive a wireless signal for selecting the diagnostic mode from an external device.

4. The refueling screw compressor according to claim 1, wherein when the diagnostic mode is selected, the control unit sets a rotation speed of the cooling fan to a constant rotation speed.

5. The refueling screw compressor according to claim 1, wherein when the diagnostic mode is selected, the control unit causes the compressor body to operate at a rotation speed of the compressor corresponding to a load factor of 100%, and causes the cooling fan to operate at a full rotation speed.

6. The refueling screw compressor according to claim 1, further comprising:
a second air release electric valve connected in parallel to the first air release electric valve; and
a dedicated orifice set with respect to the second air release electric valve,
wherein when the diagnostic mode is selected, the control unit causes the first air release electric valve to be opened and causes the second air release electric valve to be opened or closed.

7. The refueling screw compressor according to claim 1, further comprising:
a third air release electric valve connected in parallel to the discharge electric valve; and
a dedicated orifice set with respect to the third air release electric valve,
wherein when the diagnostic mode is selected, the control unit causes the third air release electric valve to be opened.

8. The refueling screw compressor according to claim 7, further comprising:
an air release silencer downstream of the third air release electric valve.

\* \* \* \* \*